United States Patent [19]

Itani

[11] 4,330,837
[45] May 18, 1982

[54] ELECTRONIC WEIGHING APPARATUS

[75] Inventor: Seiichi Itani, Sakai, Japan

[73] Assignee: Kubota Ltd., Osaka, Japan

[21] Appl. No.: 142,416

[22] Filed: Apr. 21, 1980

[30] Foreign Application Priority Data

Jun. 19, 1979 [JP] Japan .............................. 54-84608[U]
Jul. 10, 1979 [JP] Japan .............................. 54-95285[U]

[51] Int. Cl.³ .......................................... G01G 19/413
[52] U.S. Cl. ........................................ 364/567; 177/25
[58] Field of Search ...................... 364/567, 466, 571; 177/25, 1

[56] References Cited

U.S. PATENT DOCUMENTS

| | | | |
|---|---|---|---|
| 4,071,102 | 1/1978 | Ostenbridge et al. | 364/567 X |
| 4,139,069 | 2/1979 | Domis et al. | 364/567 X |
| 4,143,724 | 3/1979 | Itani | 364/567 X |
| 4,189,017 | 2/1980 | Strobel et al. | 364/571 X |
| 4,212,074 | 7/1980 | Kuno et al. | 364/466 X |
| 4,241,407 | 12/1980 | Sookikian et al. | 364/567 |

Primary Examiner—Edward J. Wise
Attorney, Agent, or Firm—W. G. Fasse; D. F. Gould

[57] ABSTRACT

An analog voltage representing the weight of an article being weighed is provided by a strain-gage type load cell. The analog voltage is converted into digital weight value data by means of an analog/digital converter. If the weight value data which are provided after the lapse of a predetermined time period following the turning on of a power supply, are within a predetermined range, the weight value data are stored in a memory as an offset value. The data stored in the memory are used for subtraction from further weight value data are displayed in digital manner by a display. If the weight value data provided after the lapse of a predetermined time period is off the predetermined range, a renewal setting of the offset value in the memory is prevented.

18 Claims, 12 Drawing Figures

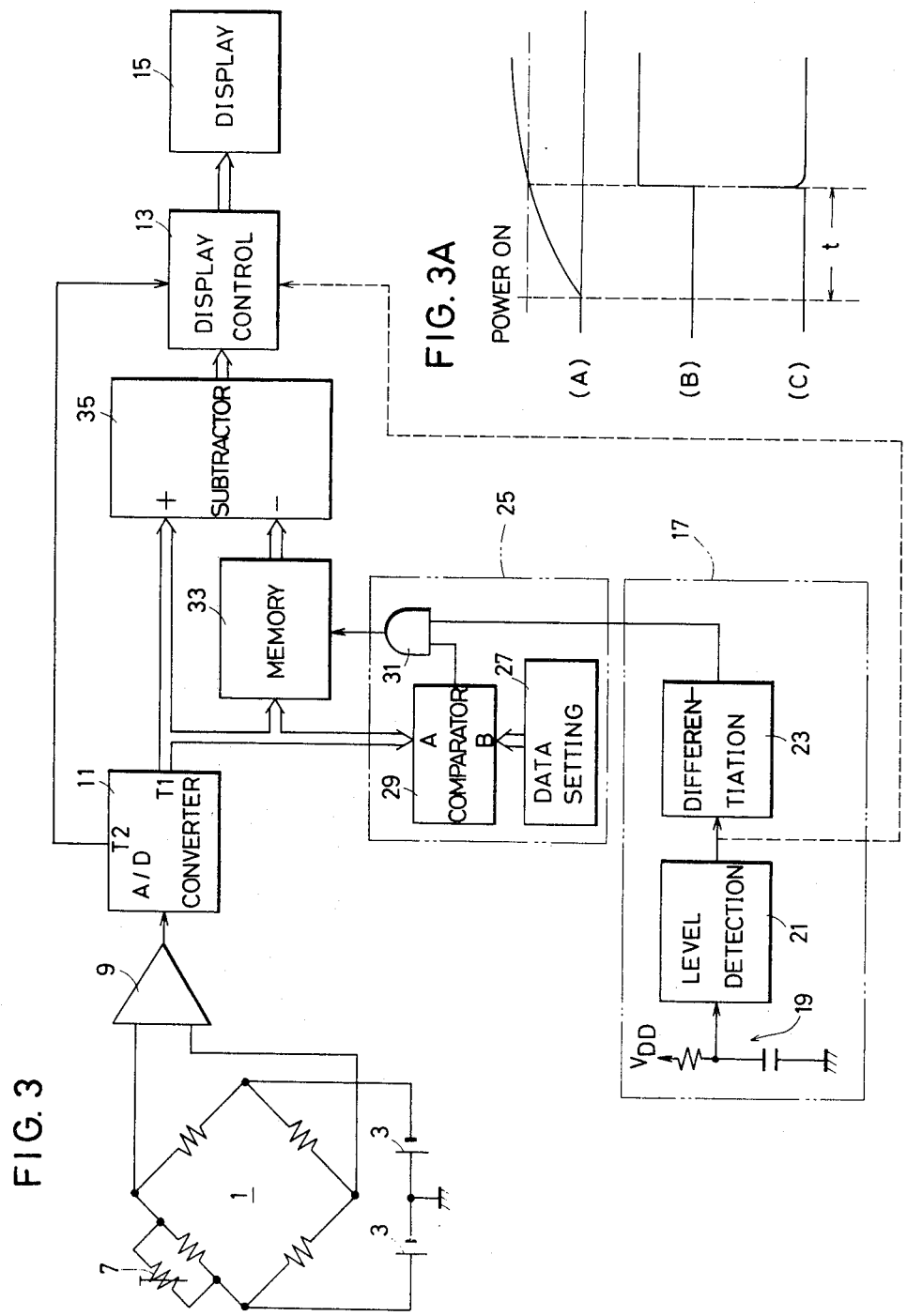

ELECTRONIC WEIGHING APPARATUS

BACKGROUND OF THE INVENTION

1. Field of the Invention;

The present invention relates to an electronic weighing apparatus. More specifically, the present invention relates to an electronic weighing apparatus wherein an analog voltage provided by a load converter such as a strain-gage type load cell is converted into a digital value, whereby the magnitude of the load is displayed in a digital manner.

2. Description of the Prior Art

Conventionally a strain-gage type load cell has been used as a load converter. One example of an electronic weighing apparatus employing a conventional strain-gage type load cell is shown in FIG. 1. Referring to FIG. 1, a weighing pan, not shown, for placing an article being weighed is coupled to a strain-gage type load cell 1. The load cell 1 comprises an energizing voltage source 3, a fine adjustment variable resistor 5 and a rough adjustment variable resistor 7. As is well known, such load cell 1 provides an analog signal of the magnitude which is proportional to the weight of an article placed on the weighing pan and the analog signal is applied to an amplifier 9. The amplified analog voltage provided by the amplifier 9 is applied to an analog/digital converter 11. The analog/digital converter 11 may comprise an integrated circuit "ICL8052/ICL71C03" manufactured by Intersil Incorporated, U.S.A. for example. The analog/digital converter 11 serves to convert a given analog voltage into a corresponding digital signal, which is applied to a display control 13 through a terminal T1. The display control 13 is responsive to a signal representing the sign of plus or minus of the given weight value provided by the terminal T2 as well as the given digital signal from the terminal T1 of the analog/digital converter 11 to cause a well-known digital display 15 to display the weight value.

In such conventional electronic weighing apparatus, it has been a common practice to make sure that the zero point of the load cell 1 and the display zero point in the display 15 coincide with each other. Accordingly, a fine adjustment is required for that purpose and such fine adjustment is accomplished by a variable resistor 5. Such variable resistor is liable to exhibit a poor temperature coefficient characteristic and is hence not necessarily stable with respect to a temperature variation. Accordingly, fine adjustment is required from time to time in accordance with a variation of an ambient temperature and it is difficult to display accurate weight data. Furthermore, the digital output obtained from the analog/digital converter 11 exhibits a stepwise variation, as shown in FIG. 2, for example, which requres that no output change occurs just at the zero point. More specifically, although a conventional weighing apparatus requires zero point adjustment to preclude an output change at the zero point, as shown in FIG. 2, the higher the resolution the more difficult is such zero point adjustment. Accordingly, a conventional electronic weighing apparatus as shown in FIG. 1 has made it impossible to enhance the resolution of an analog/digital converter.

In order to avoid the above described problem, it has been proposed that an offset value is in advance set so that the zero point of a load cell and the zero point of a display may deviate from each other, thereby to simplify a manual operation of an electronic weighing apparatus. As such an offset value, a value of approximately five percent of the full range of the scale, for example, is selected and such offset value is set in response to initiation of an operation of the apparatus upon turning on of a power supply, for example. On the occasion of weight measurement, the offset value, which is preset in advance or stored, is used for subtraction from an analog/digital converter output and the difference value is displayed as a weighed value. Thus, an electronic weighing apparatus of a type for setting an offset value avoids precise fine adjustment and accordingly can simplify a manufacturing process of the apparatus. More specifically, by setting such an offset value, any influence on a display exerted by a variation of the weight value of a placing pan for placement of an article is avoided, if such variation of the weight of a placing pan is within the range of the offset value. Hence a fine adjustment becomes unnecessary. Furthermore, since such weighing pan can be exchanged with relative freedom without precise adjustment, maintenance of the apparatus is also facilitated.

Thus, in an electronic weighing apparatus of a type for setting an offset value, such an offset value is stored in a memory. The timing for storing such offset value in a memory is selected to be responsive to initiation of an operation of the apparatus, so that the output of an analog/digital converter may be stored in a memory after a predetermined time period, say five to ten seconds, following turning on of a power supply, for example. Thus, the apparatus is structured such that the content in the memory is again applied to the output of an analog/digital converter each time when the power supply is turned on without regard to the magnitude of the weighed value at that time. In other words, even if the output from the analog/digital converter at the time of storing an offset value in a memory is relatively large, such value is stored in the memory as an offset value.

On the other hand, a load cell for use in such an electronic weighing apparatus and a structure for supporting such load cell are not necessarily designed to have a surplus mechanical strength. Accordingly, the output from such load cell exhibits a linearity characteristic only within a given limited range. Therefore, the linear portion of the output from an analog/digital converter receiving such output from a load cell is also limited to a certain restricted range. In other words, although the output of a load cell and thus the output from an analog/digital converter exhibits a linear change characteristic with respect to a variation of the weight in a given predetermined range which is inherent in an apparatus, the output does not necessarily exhibit such a linear change when the output exceeds such range. Accordingly, if and when an offset value being set in advance immediately before a weighing operation is too large and a weight value of an article being weighed is added thereto, the sum value could exceed the above described linearity range. In such a case, the weighing accuracy may not necessarily be satisfactory.

Meanwhile, in such apparatus for setting an offset value described above, it has been a common practice that a display is controlled to display "0" until such offset value is set. Furthermore, in a case where an offset value is stored in a memory in response to turning on of a power supply, the display is controlled to display "0" until after the lapse of a predetermined time period and therefore an operator cannot check the range or the magnitude of the offset value. In other words, in such a conventional apparatus, an operator cannot observe the magnitude of an offset value being stored in a memory when the weighed value is displayed. Accordingly, it is a disadvantage that the weight measurement is made without knowing whether a large change of such an offset value has occurred which would reduce the weighing accuracy.

In an apparatus in which an offset value is not stored in a memory in response with turning on of a power supply but an offset value is renewed manually, such offset value can be checked by looking at a display. However, when an apparatus is structured such that an offset value may be manually set in a memory, an offset value is renewed after an operator himself checks the magnitude of such offset value. Accordingly, in the case where such offset value is set through manual operation, it may occur, unless the range of an offset value inherent in the apparatus is known, that an erroneous judgement and accordingly an erroneous offset value renewal is made. Such a situation also reduces the operating facility of such an apparatus and deteriorates the weighing precision of the apparatus.

SUMMARY OF THE INVENTION

Briefly described, the present invention relates to an electronic weighing apparatus comprising a storage means for storing an offset value being preset and is adapted for correcting weighed value data based on the data stored in the storage means. The present weighing apparatus is characterized in that storing of such an offset value in the storage means is prevented if the offset value being preset in the storage means is outside a predetermined range.

According to the present invention, since an offset value exceeding the predetermined range is not preset, a weighing outside the linearity range of the apparatus caused by too large an offset value, which occurred conventionally, is avoided. In other words, weighing in the range where a weighing accuracy is degraded, is avoided. Accordingly, once an offset value is set, an accurate weighing is assured. In the case where an offset value is off or outside a predetermined range, such offset value is prevented from being set for renewal. Thus, it may occur that the zero point of the apparatus deviates substantially. Accordingly, based on whether an offset value can be set or not, it can be determined whether the apparatus is in a normal state or in an abnormal state. By noting down when an offset value cannot be renewed, it is easier for an operator to make the above described determination.

In a preferred embodiment of the present invention, a strain-gage type load cell is employed as a load converter and the output thereof is converted into a digital value by means of an analog/digital converter. The converted digital value is applied to a microcomputer or a microprocessor. At that time an interrupt signal is applied to the microcomputer from the analog/digital converter upon completion of the conversion, so that a microcomputer is responsive to an interrupt signal to read thereafter the digital value from the analog/digital converter. In a further preferred embodiment of the present invention, the analog/digital converter and the microcomputer are adapted to be operable in synchronism and accordingly a particular input/output register conventionally required, is not needed. Even in an apparatus employing a microcomputer, it is determined whether the above described offset value is within a predetermined range. If the offset value exceeds the above described range, the renewal setting of the offset value is prevented to avoid an inaccurate weighing.

Accordingly a principal object of the present invention is to provide an electronic weighing apparatus which is capable of preventing a reduction in the accuracy that otherwise could be caused by an offset value set in advance.

Another object of the present invention is to provide an electronic weighing apparatus wherein it is determined whether an offset value or a weight value is within a predetermined range, whereupon setting of such offset value is determined.

A further object of the present invention is to provide an electronic weighing apparatus wherein the setting of an offset value is prevented when a weight value or an offset value exceeds a predetermined range.

Still another obejct of the present invention is to provide an electronic weighing apparatus which provides to the operator an indication whether or not an offset value has been set.

Still a further object of the present invention is to provide an improved electronic weighing apparatus employing a microcomputer or a microprocessor.

These objects and other objects, features, aspects and advantages of the present invention will become more apparent from the following detailed description of the present invention when taken in conjunction with the accompanying drawings.

BRIEF DESCRIPTION OF THE DRAWINGS:

FIG. 3 is a block diagram showing one embodiment of the present invention;

FIG. 3A is a timing chart for explaining the operation of a power supply turning on detection circuit portion shown in FIG. 3;

Figure 1:
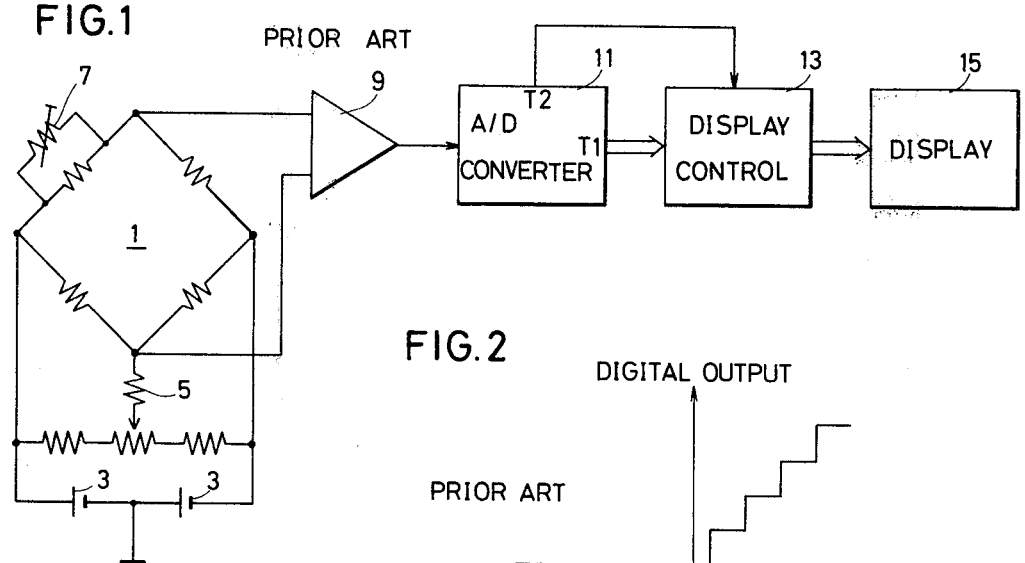
FIG. 1 is a block diagram showing one example of a conventional electronic weighing apparatus in which the present invention can be advantageously employed.
Figure 2:
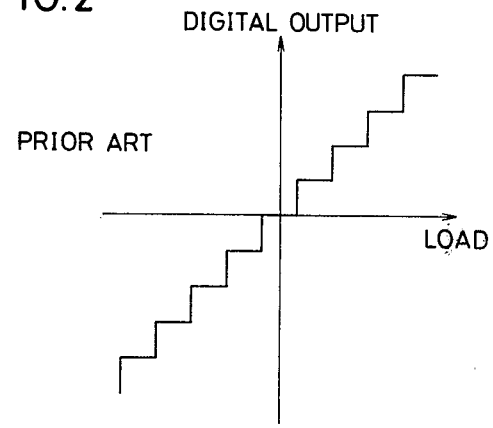
FIG. 2 is a graph showing a relation of a digital output with respect to a load for explaining a problem being encountered with the FIG. 1 prior art.

DESCRIPTION OF THE PREFERRED EMBODIMENTS:

FIG. 3 is a block diagram showing one embodiment of the present invention. The embodiment shown comprises a strain-gage type load cell 1 which comprises an energizing voltage source 3 and an adjustment variable resistor 7. The adjustment variable resistor 7 is connected to one side of a strain-gage constituting the load cell 1, so that the same serves to cancel "ineffective graduations" caused by a placing pan for placement of an article being weighed and other means, not shown, associated therewith. The output analog signal obtained from the strain-gage or load cell 1 is amplified by an amplifier 9 and is then applied to an analog/digital converter 11. By adjusting the amplification degree of the amplifier 9, it is possible to make a range adjustment. The analog/digital converter 11 may be implemented by the previously described integrated circuit, i.e. the integrated circuit model No. ICL8052/ICL71C03 manufactured by Intersil Incorporated, U.S.A. The analog/digital converter 11 has two output terminals T1 and T2. The output terminal T1 serves as a data output terminal for providing a digital signal of a binary coded decimal code associated with the magnitude of the output analog voltage obtained from the amplifier 9. On the other hand, the output terminal T2 serves as a polarity signal output terminal which provides a signal representing the polarity of the above described analog voltage which assumes the low level or the logic "zero" when the polarity is plus and which assumes the high level or the logic "one" when the polarity is minus. The data in the form of a digital signal obtained from the data output terminal T1 of the analog/digital converter 11 are applied to a comparator 29, a memory 33 and to a subtractor 35 as a minuend. The signal obtained from the polarity signal output terminal T2 of the analog/digital converter 11 is applied to a display control 13 to be described below.

A power supply turning on detecting circuit 17 comprises an integrating circuit means 19 incuding a series connection of a resistor and a capacitor. The integration circuit 19 is responsive to a voltage $V_{DD}$ when the power supply, not shown, is turned on and integrates the voltage in accordance with a predetermined integration time constant. The output of the integration circuit 19 is applied to a level detector 21 such as a Schmidt circuit. The level detector 21 is responsive to the output voltage of the integration circuit 19 to provide a signal which assumes the high level if the output voltage of the integration circuit 19 exceeds a predetermined value. The output of the level detector 21 is applied to a differentiation circuit 23 which is responsive to the rising or leading edge of the output of the level detector 21 to provide one differentiated pulse output to a determining portion 25.

The determining portion 25 comprises a data setter 27, a comparator 29 and an AND gate 31. One input of the AND gate 31 is connected to receive the differentiation pulse output from the above described differentiation circuit 23. The comparator 29 is connected to receive at one input thereof a digital signal obtained from the analog/digital converter 11 and to receive at the other input thereof an output from the data setter 27. The data setter 27 sets data representing a range of an offset value suitable for the particular type of weighing appartus. More specifically, the data setter 27 is used to set a weight value data corresponding to approximately four to five percent of the full scale or full range of the apparatus. The data setter 27 may be provided with a predetermined circuit arrangement or alternatively may be implemented by a discrete structure such as a pinboard matrix or a digital switch such as a thumb rotary switch. The comparator 29 is connected to receive as an input A the digital signal obtained from the analog/digital converter 11 and as an input B the output obtained from the data setter 27. The comparator 29 is adapted such that if the input A is smaller than the input B (i.e. A<B) the output of the high level or the logic "one" is provided, but when the input A is larger than the input B (i.e. A≧B) the output of the low level or the logic zero is provided. The output of the comparator 29 is applied to the other input of the AND gate 31. The output from the AND gate 31 is applied to a memory 33 as a write enable signal. More specifically, when the output from the AND gate 31 is the high level or the logic "one", the data in the memory 33 are renewed, whereas, when the output of the AND gate 31 is the low level or the logic "zero", data renewal in the memory 33 is inhibited. The memory 33 is used for storing an offset value and the output is applied to the subtractor 35 as a subtrahend.

The subtractor 35 evaluates a difference between the minuend i.e. the digital signal obtained from the analog/digital converter 11 and the subtrahend i.e. the digital signal obtained from the memory 33, for providing the subtraction result to the display control 13. The display control 13 is responsive to the signal received from the polarity signal output terminal T2 of the analog/digital converter 11 and the subtraction result (a digital signal) obtained from the subtractor 35 to digitally display a weighed value by means of the display 15 in accordance with the received digital signal when the signal obtained from the terminal T2 is the low level or the logic "zero". On the other hand, when the polarity signal is the high level or the logic "one", the display 15 is caused to make a predetermined display without regard to the input digital signal received from the subtractor 35.

Meanwhile, the display control 13 may be structured to receive the signal from the level detector 21 included in the power supply turning on detecting portion 17. The display control 13 causes the display 15 to make another predetermined display until the high level signal is received from the level detector 21. The display control 13 will be described below in more detail with reference to FIGS. 5 and 6.

Figure 4:
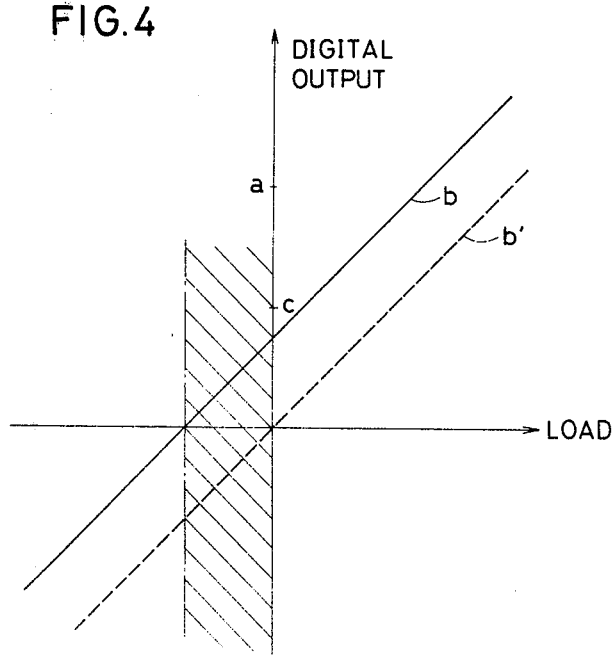
FIG. 4 is a graph showing an analog voltage output and thus a digital output with respect to a load for explaining the operation of the FIG. 3 embodiment.

The weight value data being set in the data setter 27 correspond to a point "a" shown in FIG. 4 and corresponds to approximately four to five percent of the full scale range of the electronic weighing apparatus shown. Referring to FIG. 4, the lines b and b' representing the output show that the output changes in accordance with an adjustment of the variable resistor 7 shown in FIG. 3.

The just described apparatus operates as follows. Upon turning on of the power supply, the integration circuit 19 initiates the integration, as shown at (A) in FIG. 3A, so that the output gradually increases. When the output voltage of the integration circuit 19 reaches a predetermined value, the high level signal is obtained at that time from the level detector 21, as shown at (B) in FIG. 3A. Accordingly, the differentiation circuit 23 provides a differentiated pulse at that time, as shown at (C) in FIG. 3A.

On the other hand, upon turning on of the power supply, an analog signal representing the load at that time is obtained from the strain-gage type load cell 1 and accordingly a digital signal representing the load is provided by the analog/digital converter 11 through its output terminal T1. The comparator 29 provides the output of the logic "one" or the high level if the received digital data signal (A) is smaller than the digital data signal (B) provided from the data setter 27. The AND gate 31 is responsive to the logical product of the output of the high level obtained from the comparator 29 and the pulse obtained from the differentiation circuit 23 to provide a write enable signal to the memory 33. More specifically, during a time period after turning on of the power supply until the pulse is obtained from the differentiation circuit 23, i.e. after the lapse of a time period t in FIG. 3A, the determining portion 25 determines whether the data obtained from the analog/digital converter 11 is within the predetermined weight value data at that time. More specifically, the determining portion 25 determines whether an offset value being set after the lapse of a time period t0 after turning on the power supply, is within the predetermined range, i.e. a range where a linearity of the apparatus is not degraded. If the offset value (A) is smaller than a predetermined weight value (B), i.e. if the data (A) is within the point "a" shown in FIG. 4, the memory 33 is enabled to set the data given at that time in a renewal manner as an offset value. On the other hand, the data set in the memory 33 is applied to the subtractor 35. However, at that time it is supposed that the two inputs of the minuend and of the subtrahend of the subtractor 35 are of the same value and accordingly, the display 15 is caused to display "0" as a weighed value.

At the time when the time period t has lapsed and if the given data (A) exceeds the preset weight value data (B), the comparator 29 provides at its output the low level or the logic "zero". Accordingly, the AND gate 31 blocks the pulse obtained from the differentiation circuit 23 and thereby disables the memory 33 to renew the data. Therefore, a renewed setting of an offset value in the memory 33 is prevented. In other words, in such a case the memory 33 is not loaded with any offset value.

The variable resistor 7 for canceling "ineffective graduations" is adjusted so that the output voltage obtained from the amplifier 9 comes to a midway point c below the point "a" shown in FIG. 4 if no article is placed on the apparatus. An adjustment to such midway point "c" is made as follows. After turning on the power supply, the weighing pan, not shown, is slightly raised, so that the ineffective graduation component exerted on the load cell 1 may be decreased. Then the display value immediately before the indication by the display 15 changes to "0" is read and the read display value is compared with a standard value which is known in advance. If there is a deviation between the read display value and the known standard value, again the variable resistor 7 is adjusted to make both coincide with each other. Through the above described operation, setting to the midway point c can be made with ease.

Figure 5:
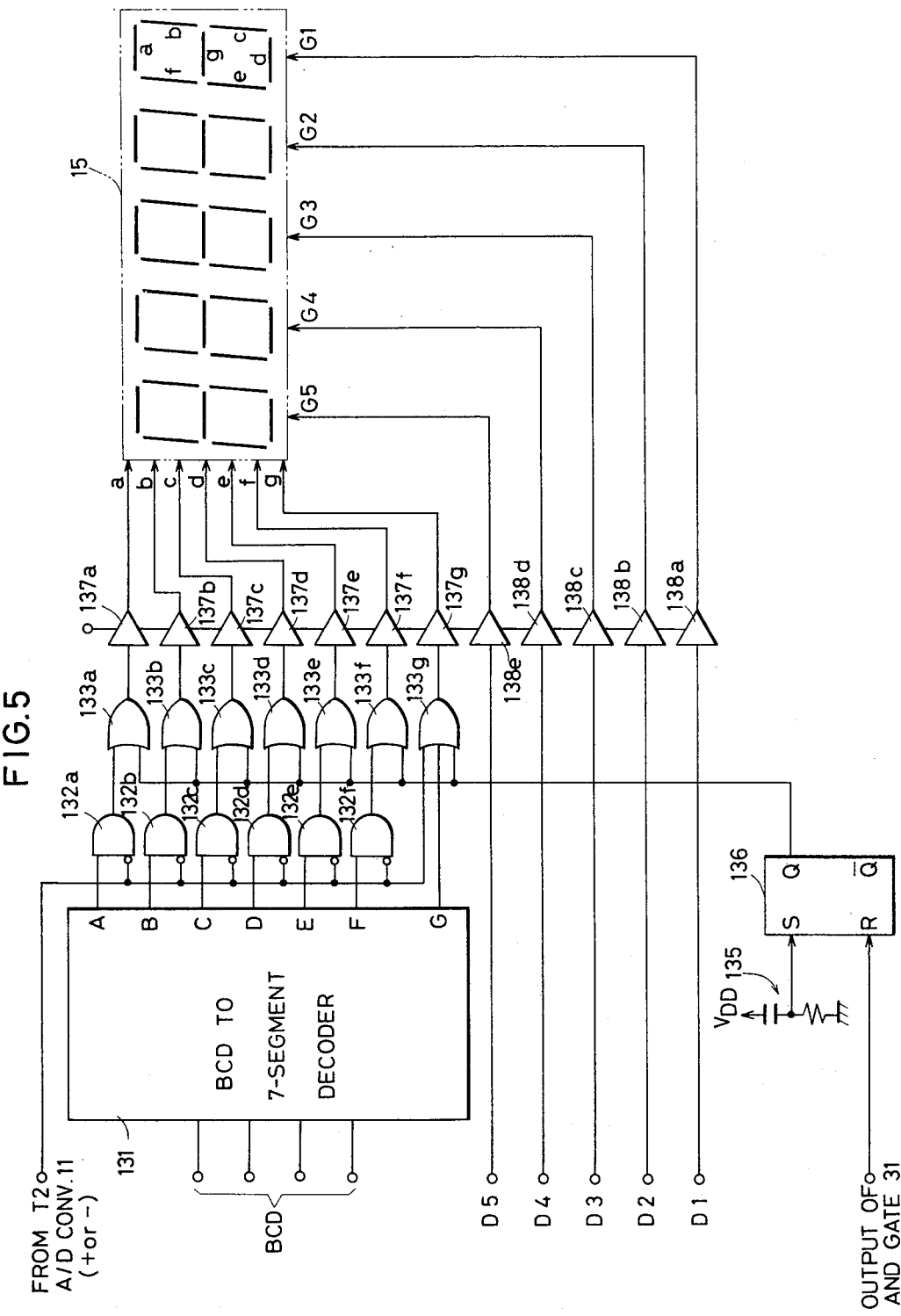
FIG. 5 is a schematic circuit diagram of a preferred embodiment of a display control.
Figure 6:
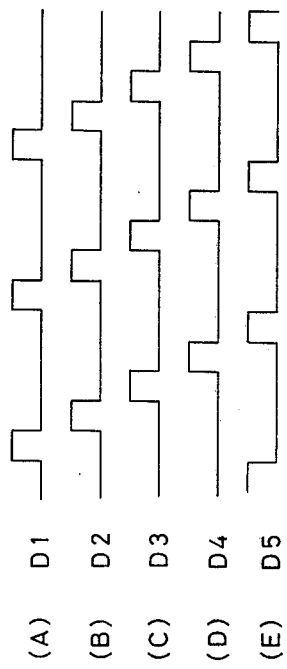
FIG. 6 is a timing chart for explaining the operation of the circuit shown in FIG. 5.

Now referring to FIGS. 5 and 6, the display control 13 and a display manner by the display 15 responsive thereto will be described. As shown in FIG. 5, the display control 13 comprises a decoder 131 connected to receive the digital data of a binary coded decimal code obtained from the subtractor 35, for example. The decoder 131 decodes the received digital data of the binary coded decimal code to form segment selection signals corresponding to seven segments "a to g" of each digit position of the display 15. The outputs A to G correspond to the segments a to g, respectively, of each digit position of the display 15. The outputs A to F from the segment decoder 131 are applied to the corresponding inhibit gates 132a to 132f, respectively. The inhibit gates 132a to 132f receive at the respective inhibit inputs a polarity signal obtained from the analog/digital converter 11 through the output terminal T2. The outputs of the inhibit gates 132a to 132f are applied to one input of each of the corresponding OR gates 133a to 133f. The OR gates 133a to 133f receive, at the other input thereof, the output Q of a flip-flop 136. The signal obtained from the output G of the segment decoder 131 is applied to one input of the corresponding OR gate 133g. The OR gate 133g is also connected to receive the above described polarity signal and the output Q of the flip-flop 136. The outputs of the OR gates 133a to 133g are applied through the respective corresponding drivers 137a to 137g to energize the respective segments a to g of the display 15. In the display 15 the corresponding segments of each of the digits, in the embodiment shown, five digits, are connected, so that the corresponding segments are driven by the output of the corresponding drivers. Digit signals D1 to D5 have a timing relation as shown in FIG. 6, so that the respective digits G1 to G5 of the display 15 may be driven by the corresponding drivers 138a to 138e.

The set input S of the flip-flop 136 is connected to receive the output of the differentiation circuit 135 and the reset input R of the flip-flop 136 is connected to receive the output of the AND gate 31 included in the determining portion 27. The differentiation circuit 135 provides one differentiated pulse when the power supply is turned on, for example. Accordingly, the flip-flop 136 is responsive to turning on of the power supply to cause the output Q to assume the high level.

In operation, first the display of a positive weighed value will be described. In such a case any inhibit inputs are applied to the inhibit gates 132a to 132f and accordingly the respective outputs A to F obtained from the segment decoder are applied as such through the OR gates 133a to 133f to the drivers 137a to 137f. The output G of the segment decoder 131 is applied as such through the OR gate 133g to the corresponding driver 137g. On the other hand, since the digit signals D1 to D5 are provided in succession in a cyclic manner as shown in FIG. 6, the display 15 is responsive to the segment selecting signals for displaying the data in a digital manner in accordance with a well-known dynamic driving system.

Now a case where the voltage from the amplifier 9 is minus will be described. In such a case, the output of the high level or the logic "one" is obtained from the terminal T2 (FIG. 3) of the analog/digital converter 11. Therefore, the inhibit gates 132a to 132f are inhibited from providing the data signal. Accordingly, the outputs A to F obtained from the segment decoder 131 are inhibited by the corresponding inhibit gates 132a to 132f. However, only the output G is applied through the OR gate 133g to the driver 137g. Accordingly, the display 15 is responsive to the respective digit selecting signals D1 to D5 to display by the segment G of the corresponding digits G1 to G5. Therefore, an indication by the display becomes "- - - - -", thereby to indicate that the weighed value is minus.

When the power supply is turned on, the flip-flop 136 is set to respond to the output from the differentiation circuit 135, whereby the output Q of the flip-flop 136 assumes the high level. Therefore, the outputs obtained from the OR gates 133a to 133g and are applied to the corresponding drivers 137a to 137g. Accordingly, all the segments "a to g" of the respective digits G1 to G5 in the display 15 are energized, thereby to display an "8" in all of the digits. Thereafter, when a pulse is obtained from the AND gate 31 shown in FIG. 3, i.e. after the lapse of a predetermined time period t (FIG. 3A) after turning on of the power supply, the flip-flop 136 is reset and if the weight value data (offset value) at that time does not exceed the predetermined range, the output Q is reversed to the low level. Accordingly, in such a case the display 15 continues to display an "8" in all of the digits until after the lapse of the time period t following turning on of a power supply. After the lapse of the time period t the display 15 shows a digital display associated with the output obtained from the segment decoder 131. While displaying an "8" in all the digits, such display may be made to blink by repeatedly turning the power supply of the display 15 on or off, for example. In the absence of a pulse from the AND gate 31 even after the lapse of a time period t following the turning on of the power supply, i.e. when the data (offset value) obtained from the analog/digital converter 11 exceeds the predetermined range after the lapse of a time period t (the point "a" in FIG. 4), the flip-flop 136 is not reset and accordingly the indication of "8" at the respective digits in the display 15 continues without resetting. As a result, an operator knows that the apparatus is in some serious trouble for some reason, so that the zero point of the apparatus has largely deviated from its correct position. Under the just described circumstances the operator also knows that a weighing measurement does not necessarily provide an accurate weighed value. Since the apparatus is adapted such that when a weighed value becomes minus in the case where the weighing pan, not shown, is raised for some reason, an indication of "—" is made in the respective digits in the display 15 as described previously, such situation can also be confirmed with ease.

Figure 7:
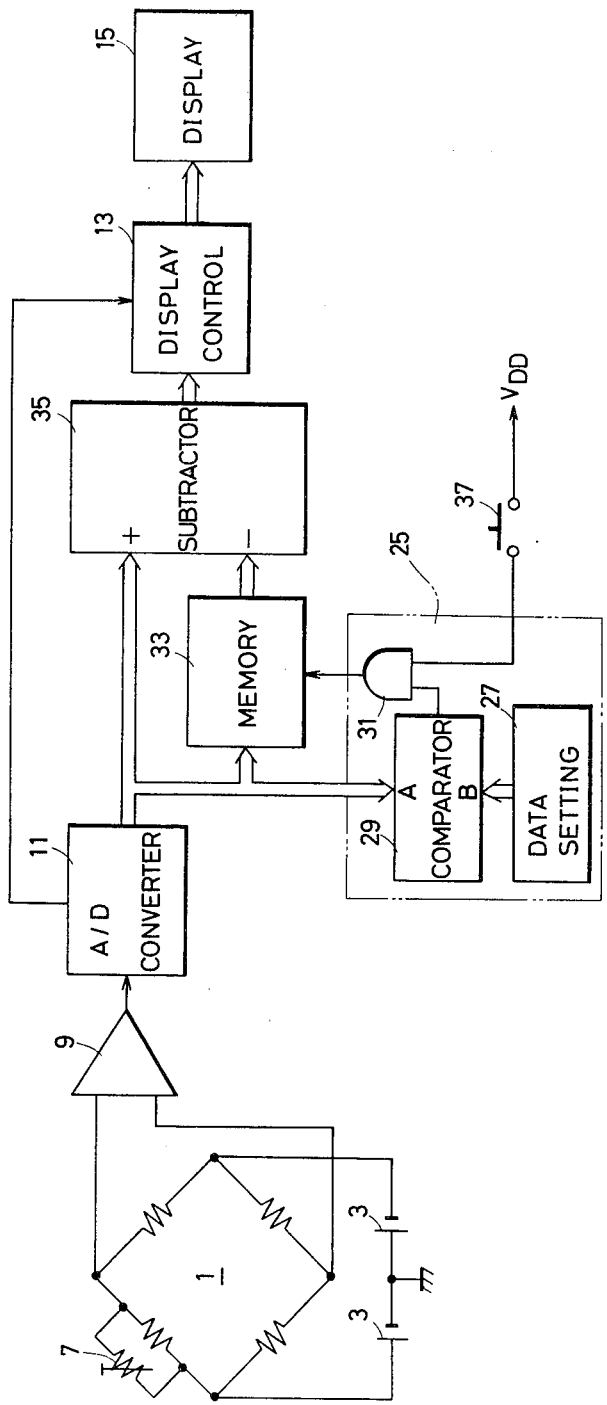
FIG. 7 is a block diagram showing another embodiment of the present invention.

FIG. 7 is a block diagram showing another embodiment of the present invention. The FIG. 7 embodiment is substantially the same as the FIG. 3 embodiment, except in the following respects. Therefore, a detailed description of the same portions in the FIG. 7 as those in the FIG. 3 will be omitted. The FIG. 7 embodiment comprises a push button switch 37 which may be considered to correspond to the power supply turning on detecting portion 17 in FIG. 3. More specifically, in FIG. 7, upon operating the push button switch 37, one input of the AND gate 31 assumes the high level and a write operation of the memory 33 is controlled in response to the output from the comparator 29 at that time. More specifically, although in FIG. 3 a write operation of an offset value in the memory 33 was automatically controlled in response to turning on of a power supply, in FIG. 7 such writing operation may be controlled as desired at the desired timing by operating the manual switch 37. By doing so, the determining portion 25 can be made effective and, as described above, if and when the output of the analog/digital converter 11 at that time is outside the range of the preset weight value data, i.e. the offset value as preset is outside the predetermined range, the offset value is not set in a renewal manner in the memory 33 even if the manual switch 37 is operated at that time.

In although the above described embodiments an indication "- - - - -" was made in the display 15 in response to the polarity signal obtained from the analog/digital converter 11, thereby to give notice of an abnormality of the placing pan. However, such notifying means may be implemented by a separate display element without relying upon the display 15. Alternatively, such notifying means may comprise a sound alarm means such as a buzzer.

Figure 8:
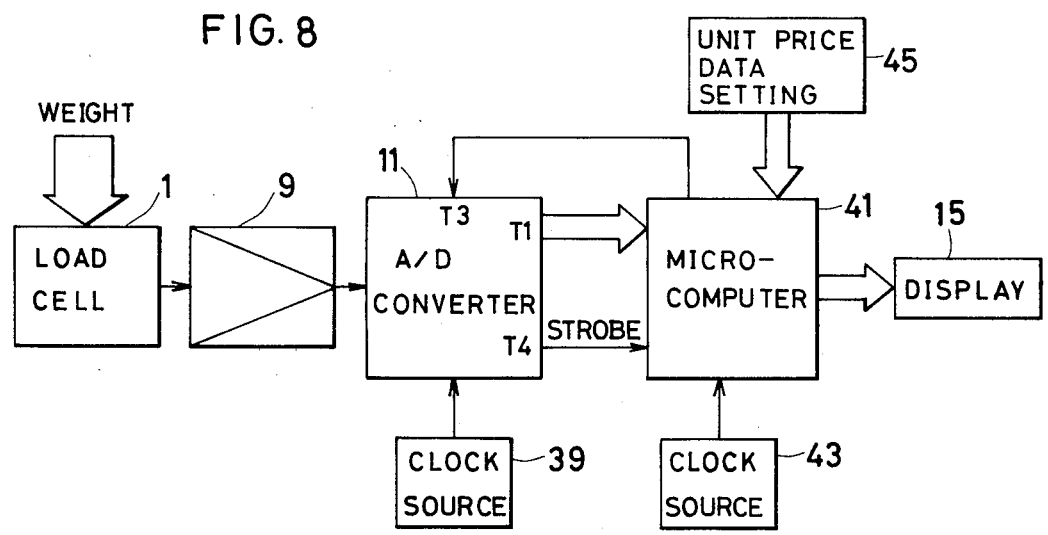
FIG. 8 is a block circuit diagram showing still another embodiment of the present invention.

FIG. 8 is a block diagram showing a further embodiment of the present invention, implemented as a price scale employing a microcomputer 41. To that end, the microcomputer 41 is connected to receive data from a unit price data setter 45 as well as the output from the analog/digital converter 11. In the FIG. 8 embodiment the load cell 1 is implemented as a strain-gage type and the analog/digital converter 11 may be implemented by the previously described integrated circuit. The microcomputer 41 may comprise model No. "6500 series" manufactured by Rockwell International Corporation, U.S.A. The unit price data setter 45 is used to set a unit price of the commodities, such as a price per 100 g. Accordingly, the microcomputer 41 is responsive to the given weight value data and the unit price data to calculate the price of the commodity and display the same on the display 15. Since a structure of such price scale is well-known to those skilled in the art, a more detailed description thereof will be omitted.

As is well-known, the microcomputer 41 comprises a read only memory for storing a system program for the apparatus, and a random access memory having a register for temporarily storing the digital data obtained from the analog/digital converter 11 and regions for storing other data. The read only memory and the random access memory, not shown, are controlled by an arithmetic logical unit. The microcomputer 41 further comprises an input/output interface, so that the signal from the analog/digital converter 11 is applied through the input/output interface, not shown, to the arithmetic logical unit, not shown, and the signal from the arithmetic logical unit is applied through the input/output interface to the analog/digital converter 11 and the display 15. The analog/digital converter 11 is responsive to the clock signal obtained from a first clock source 39 to convert the analog voltage into a digital signal. The microcomputer 41 is also responsive to a clock signal obtained from a second clock source 43. The clock pulse signal obtained from the first clock source 39 is selected to be, for example, in the range of 200 to 500 kHz, whereas the clock pulse signal obtained from the second clock source 43 is selected to be, for example, in the range of 1 to 2 MHz. The signal applied from the microcomputer 41 to the input terminal T3 of the analog/digital converter 11 is a conversion enable signal (C/S). The signal provided from the output terminal T3 of the analog/digital converter 11 to the microcomputer 41 is a strobe signal. The microcomputer 41 is connected to receive the strobe signal as an interrupt signal input.

Figure 9:
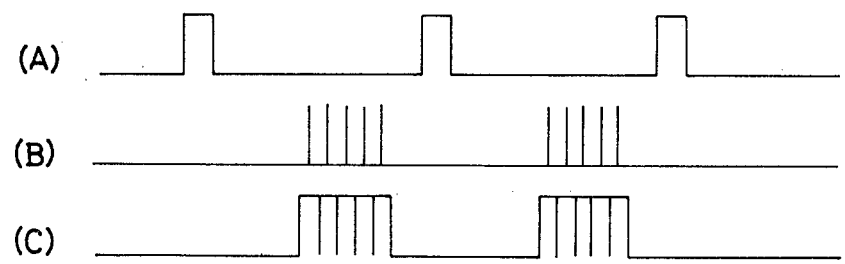
FIG. 9 is a timing chart for explaining the operation of the circuit of FIG. 8.

Referring to FIG. 9, a read operation of the data from the analog/digital converter 11 into the microcomputer 41 in the FIG. 8 embodiment will be described. The microcomputer 41 provides a conversion enable signal from the terminal C/S to the terminal T3 of the analog/digital converter 11 at a predetermined cycle determinable based on the clock pulse obtained from the second clock source 43. The conversion enable signal is shown as (A) in FIG. 9. The analog/digital converter 11 is responsive to the conversion enable signal to convert the analog voltage obtained from the amplifier 9 into digital data as a function of the clock pulse obtained from the first clock source 39. The analog/digital converter 11 is responsive to the completion of the converting operation to provide the strobe signal (interrupt signal) to the microcomputer 41 from the output terminal T4. At the same time, the converted digital data of the binary coded decimal code is supplied to the data output terminal T1. Accordingly, the microcomputer 41 is responsive to the interrupt signal, i.e. the strobe signal to read from the data output terminal T1 the data provided to the input/output terminal, as shown as (C) in FIG. 9. Then the microcomputer 41 calculates the price of the commodity based on the unit price obtained from the unit price data setter 45 and based on the newest weighed data, whereupon the result is displayed by the display 15. After such one cycle operation or control processing is completed, the microcomputer 41 provides again the conversion enable signal C/S to the analog/digital converter 11. Therefore, the analog/digital converter 11 is operable in synchronism with the processing operation by the microcomputer 41 in a common cycle. Therefore, if the load on the load cell 1 changes, the display value by the display 15 is displayed in a renewal manner in response to each conversion enable signal C/S obtained from the microcomputer 41. Thus, since the microcomputer 41 is responsive to the strobe signal or the interrupt signal obtained from the analog/digital converter 11 to read the data as shown as (C) in FIG. 9, an FIFO register (a first-in-first-out register) which was conventionally required in this type of microcomputer can be dispensed with.

Now referring to FIGS. 10 and 11, the operation of the FIG. 8 embodiment will be described.

Figure 10:
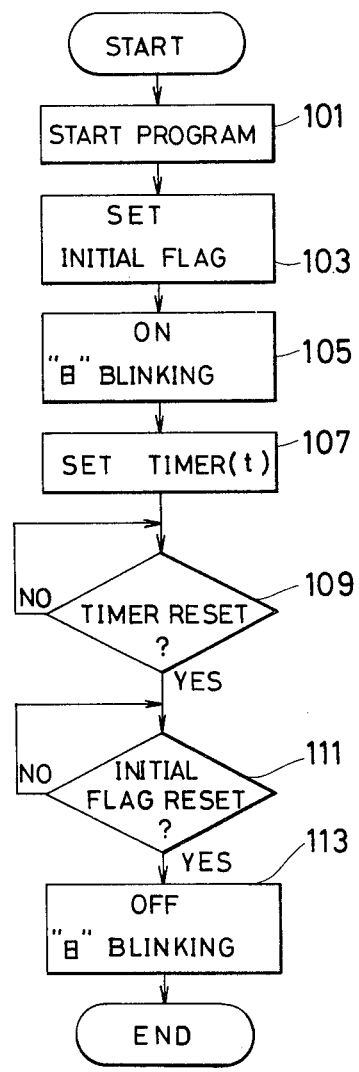
FIGS. 10 and 11 are flow diagrams for further explaining the operation of the circuit of FIG. 8.

FIG. 10 is a flow diagram for explaining the operation of the FIG. 8 embodiment when the power supply is turned on. More specifically, when a power supply, not shown, is turned on in the FIG. 8 embodiment, a routine shown in FIG. 10 is started and the microcomputer 11 initiates the system program at the first step 101. Then the microcomputer receives the output from the power supply turning on detecting means such as a differentiation circuit as shown in FIG. 5, for example, whereby an initial flag is set at the step 103. Such initial flag is formed in a portion of the regions in the random access memory, not shown. Then at the step 105 a command for a display manner described above in conjunction with the FIG. 5 embodiment is provided. More specifically, in the FIG. 5 embodiment, an indication "8" was made in all of the digits G1 and G5 in the display 15 when the power supply is switched on. Preferably such indication was made in a blinking manner. Therefore, in FIG. 8 the microcomputer 41 is also adapted for providing an instruction for a blinking "8" display in each of the respective digits in the display 15 when the power supply is turned on. In the following step 107 a timer for a predetermined time period (t) is set. Such timer function can also be implemented using a portion of the regions in the random access memory, not shown. Then in the step 105 the microcomputer 41 determines whether the predetermined time period (t) has lapsed, i.e. whether the timer, not shown, is reset. If it is determined in the step 109 that the timer is reset, i.e. the preset time period (t) has lapsed, the microcomputer 41 determines in the step 111 whether the initial flag has been reset. If the initial flag has been reset, then the instruction for a blinking indication of "8" in each of the respective digits in the display 15 is turned off. Meanwhile, the initial flag is reset in the routine shown in FIG. 11. Thus, the microcomputer 41 causes an indication "8" to be made in a blinking manner in each of the respective digits in the display 15 at the beginning of turning on after a power supply at least for the above described predetermined time period (t). As a result, the operator knows that a weighing cannot be made during that time period.

Figure 11:
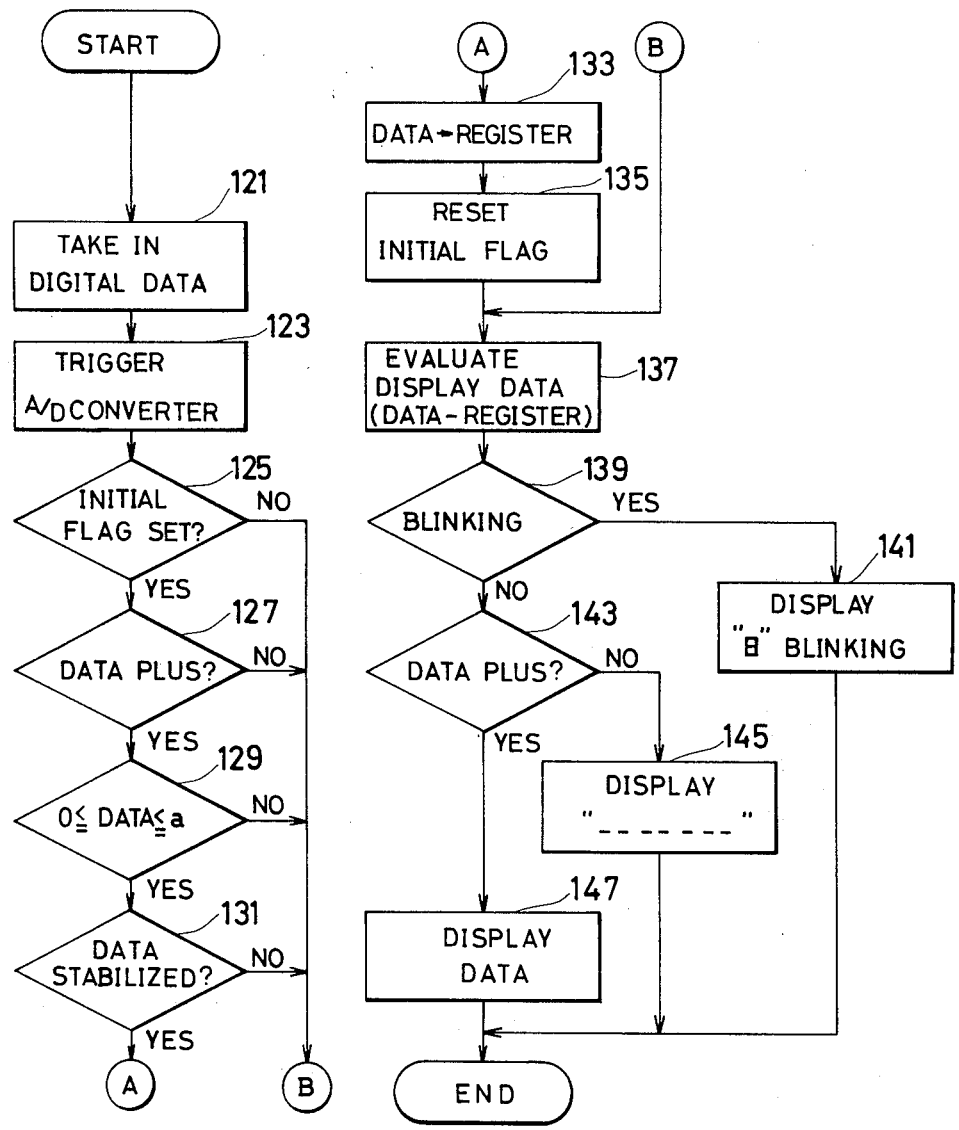

FIG. 11 is a flow diagram for explaining the operation when an interrupt signal is provided from the analog/digital converter 11 to the microcomputer 41. More specifically, if the strobe signal or the interrupt signal is provided by the analog/digital converter 11, the microcomputer 41 receives at the first step 121 the data from the analog/digital converter 11, i.e. the data provided from the input/output interface. These data are received as described above with reference to FIG. 9. Then in the following step 123 the microcomputer 41 provides the conversion enable signal (the signal from the terminal C/S) to the analog/digital converter 11, thereby to trigger the analog/digital converter 11. Then in the step 125 the microcomputer 41 determines whether the initial flag has been set. As described above, at the beginning of turning on of a power supply, the initial flag has been set. If and when the initial flag has been set, then in the following step 127 it is determined whether the data from the analog/digital converter 11 is "plus", if so, it is determined in the step 129 whether the data is within a predetermined range, (the range from zero to "a" in FIG. 4, for example). If the data is within that range, then the microcomputer 41 determines in the step 131 whether such weighed value data is in a stabilized state. The determination as to whether the data is in a stabilized state can be made based on whether the data items being received in succession are the same. For example, in a situation where the placing pan, not shown, is vibrating, the previous data item and the present data item do not coincide with each other, whereas if the placing pan is in a stabilized state it is supposed that the previous data item and the present data item coincide with each other in such a situation. Accordingly, by comparing the previous data item and the present data item, it may be determined whether the data is in a stabilized state. If it is determined in the step 131 that the data has reached a stabilized state, the microcomputer 41 stores the stabilized data obtained form the analog/digital converter 11 in a temporary storing register, not shown. Such temporary storing register can also be implemented by using a portion of the random access memory, not shown, and corresponds to the memory 33 in FIG. 3. After the microcomputer 41 has stored the data obtained from the analog/digital converter 11, the microcomputer 41 resets in the step 135 the initial flag which was set when a power supply was turned on.

If the decision in any one of the previously described steps 125, 127, 129 and 131 is "NO", the microcomputer 41 shifts to the following step 137.

Accordingly, if it is determined in the step 129 that the data obtained from the analog/digital converter 11 exceeds a predetermined range, namely a range of an offset value allowed in advance in accordance with the type of scale involved, the microcomputer 41 then determines in the step 139 whether the blinking indication by the display 15 at the beginning of turning on of a power supply described above in conjunction with FIG. 10, is in an on state. If it is determined in the step 139 that the blinking indication by the display 15 is continuing, then in the step 141 such blinking indication is continued. As a result, an operator knows that the offset value being stored at that time is outside the allowed range and in such a situation the offset value cannot be set.

If the decision in the step 127 is "NO", i.e. if the data as received is "minus", the microcomputer 41 shifts through the steps 139 and 143 to the step 145, where an indication "—" is displayed at each of the respective digits in the display 15, thereby to indicate that the weighed data is "minus".

In a weighing operation after the offset value is set and if the initial flag has been reset in the previous step 135, the decision in the step 125 is "NO" and the microcomputer 41 shifts to the step 137. In the step 137 a difference between the weighed value data obtained from the analog/digital converter 11 and the data previously stored in the temporary storing register, i.e. the offset value is calculated and the difference is displayed by the display 15. Thereafter the microcomputer 41 shifts through the steps 139 and 143 to the step 147 and in the step 137 the evaluated weighed value data is displayed by the display 15.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. An electronic weighing apparatus, comprising: power supply means, weight value data providing means for providing data representing the weight of an article being weighed, storage means for storing said weight value data obtained from said weight value data providing means, correcting means responsive to said stored data in said storage means for correcting said weight value data, display means for displaying said weight value data as corrected by said correcting means, storage enabling means for enabling the storage of said weight value data in said storage means, said storage enabling means comprising timing means responsive to said power supply means for providing a signal for said storage enabling after the lapse of a predetermined time period following turning on of said power supply means, determining means for determining whether said weight value data are within a predetermined range, disabling means responsive to a decision by said determining means that said weight value data is not within said predetermined range for thereby disabling said storage enabling means.

2. The electronic weighing apparatus in accordance with claim 1, wherein said weight value data providing means comprises load converting means for providing an analog voltage associated with said weight, and analog/digital converting means for converting said analog voltage from said load converting means into digital data.

3. The electronic weighing apparatus in accordance with claim 2, wherein said storage means comprises digital memory means.

4. The electronic weighing apparatus in accordance with claim 1, wherein said determining means comprises data setting means for setting data concerning said predetermined range, and comparing means for comparing said set data in said data setting means and said weight value data obtained from said weight value data providing means.

5. The electronic weighing apparatus in accordance with claim 1, wherein said disabling means comprises prohibiting means responsive to the output of said determining means for prohibiting transmission of said storage enabling from said storage enabling means to said storage means.

6. The electronic weighing apparatus in accordance with claim 1, wherein said timing means comprise time delay means including time constant circuit means being charged in response to said turning on of said power supply, level detecting means for providing an output when the output voltage from said time constant circuit means reaches a predetermined level, and signal generating circuit means responsive to the output of said level detecting circuit means for providing said signal for said storage enabling.

7. The electronic weighing apparatus in accordance with claim 1, wherein said timing means of said storage enabling means comprises a manually operable switch.

8. The electronic weighing apparatus in accordance with claim 1, which further comprises disabling state notifying means for notifying a disabling state when said storage enabling is disabled by said disabling means.

9. The electronic weighing apparatus in accordance with claim 8, wherein said disabling state notifying means comprises visual indicating means.

10. The electronic weighing apparatus in accordance with claim 9, wherein said visual indicating means comprises a portion of said display means.

11. The electronic weighing apparatus in accordance with claim 10, wherein said display means comprises digital display means having a plurality of digit positions, said digital display means comprising a segment arrangement including a group of segments in each of said plurality of digit positions, and wherein said visual indicating means comprises segment energizing means for energizing a specified segment out of said segments for each digit.

12. The electronic weighing apparatus in accordance with claim 11, wherein said segment energizing means comprises blinking drive means for energizing said specified segments in a blinking manner.

13. The electronic weighing apparatus in accordance with claim 8, wherein said disabling state notifying means comprises audible sound providing means.

14. The electronic weighing apparatus in accordance with claim 1, further comprising plus/minus detecting means for detecting a plus/minus characteristic of said weight value data obtained from said weight value data providing means, and minus data notifying means responsive to the minus detected output from said plus/minus detecting means for notifying that said weight value data is minus.

15. The electronic weighing apparatus in accordance with claim 14, wherein said minus data notifying means comprises visual indicating means.

16. The electronic weighing apparatus in accordance with claim 15, wherein said visual indicating means comprise a portion of said display means.

17. The electronic weighing apparatus in accordance with claim 16, wherein said display means comprises digital display means having a plurality of digit positions, said digital display means comprising a segment arrangement having a group of segments at each of said plurality of digit positions, and wherein said visual indicating means comprise further segment energizing means for energizing a specified segment among said segments at each of said plurality of digit positions.

18. The electronic weighing apparatus in accordance with claim 1, wherein said correcting means comprises subtracting means for receiving said weight value data obtained from said weight value data providing means as a minuend and for receiving said stored data in said storage means as a subtrahend.

* * * * *